United States Patent
Marfiewicz

[11] 3,790,318
[45] Feb. 5, 1974

[54] BLOW MOLDING MACHINES
[75] Inventor: Wilhelm Marfiewicz, Berlin, Germany
[73] Assignee: Firma Emil Korsch Spezialfabrik Fur Komprimiermaschinen, Berlin, Germany
[22] Filed: Apr. 10, 1972
[21] Appl. No.: 242,591

[52] U.S. Cl............................. 425/326 B, 425/387 B
[51] Int. Cl............................................. B29d 23/03
[58] Field of Search 425/DIG. 205, DIG. 206, 326 B, 425/387 B

[56] References Cited
UNITED STATES PATENTS
3,235,907  2/1966  Harwood ................. 425/DIG. 205
3,449,481  6/1969  Tahara ..................... 425/DIG. 205

*Primary Examiner*—Richard B. Lazarus
*Attorney, Agent, or Firm*—McGlew and Tuttle

[57] ABSTRACT

A blow molding machine for producing hollow bodies of thermoplastic material, by the blow-extrusion process, includes blow mold halves arranged inside a chase between form plates of the chase. The chase is displaceable between a receiving position, aligned with an extrusion nozzle, and a blowing position offset laterally relative to the receiving position. Vertical guides on the form plates engage guide plates on the blow mold halves for vertical displacement of the blow mold halves relative to the chase to lower the blow mold halves when the chase is moved to the blowing position. A rack and gear type lifting mechanism acts between the form plates and the blow mold halves and operates automatically, responsive to movement of the chase to the blowing position, to lower the blow mold halves. Rollers may be interposed between the guide plates and the form plates to facilitate relative movement. The blow mold halves may be closed by the usual cylinder and piston arrangements, but preferably are closed by a toggle mechanism which moves the two blow mold halves toward each other, the blow mold halves being supported for such movement on guide rods.

9 Claims, 9 Drawing Figures

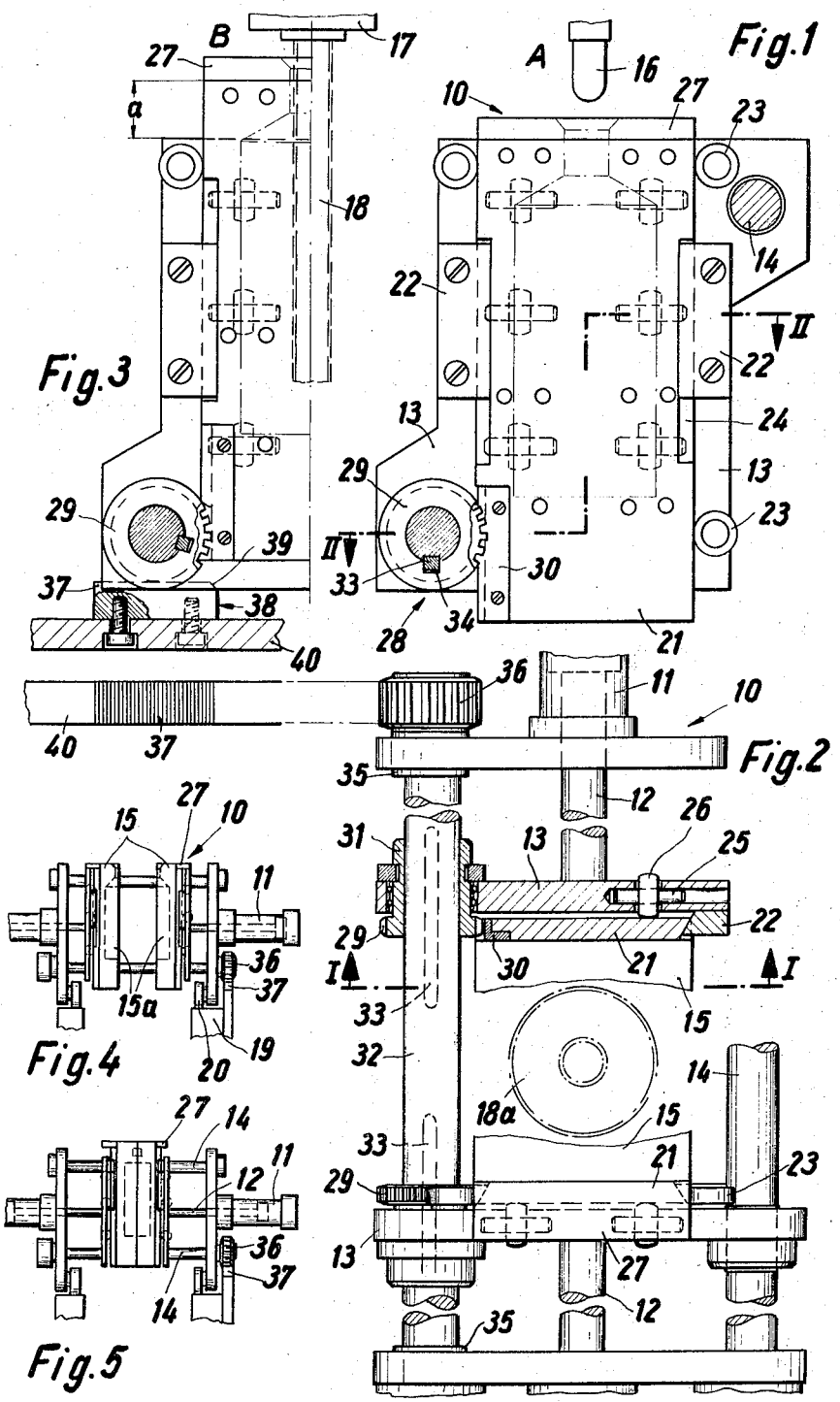

BLOW MOLDING MACHINES

BACKGROUND OF THE PRIOR ART

In the extrusion-blow process, a tubular preform is extruded from a downwardly directed annular nozzle of the blow molding machine, and received between two blow mold halves of a divided mold. The tube section fed into the blow mold is severed after the mold is closed. Then the closed mold is moved, inside the chase and together with the latter, laterally to the blowing station and, at the same time, is lowered. The lowering speed is subject to certain limits, as the entire mass of the chase, including the two mold halves, must be lowered and raised. The exit speed of the tube extruded from the nozzle must, in any event, be relatively small so that the further extruded tube is not hindered by the mold. As such blowing devices operate with a continuous discharge of the tube from the extrusion nozzle, their output is essentially dependent on the rate of extrusion of the tube.

SUMMARY OF THE INVENTION

The invention is directed to a blow molding machine, for the production of hollow bodies from thermoplastic material, by the extrusion-blow process, where the blow mold halves of a divided mold are arranged inside a chase between form plates of the chase, and the blow mold is movable by a horizontal transport drive between a receiving position, at an extrusion nozzle, and a blowing position, offset downwardly and laterally relative to the receiving position.

The objective of the invention is to attain a higher extrusion speed, and thus an increase in output, and to be able to adapt the mass to be moved vertically, in blow molding machines of the mentioned type, to a higher rate of extrusion.

Another objective of the invention is to attain an absolute synchronism of the two blow mold halves by simple means with a mechanical lifting gear.

A further object of the invention is to let a vertical downward movement of the blow mold halves occur at the extrusion station by mechanical means, so that a true vertical movement of the two blow mold halves, away from the extrusion nozzle, takes place, so that the further extruded tube is immediately clear of the blow mold.

In accordance with the invention, the mass to be moved vertically in blow molding machines of the mentioned type is reduced as much as possible, and this is attained in that the blow mold halves are movable in vertical guides on the form plates, relative to the chase. The blow mold halves are secured to guide plates engaged with the vertical guides, and a lifting mechanism acts between the guide plates and the form plates, with guide rolls being arranged between the guide plates and the form plates to facilitate vertical displacement of the guide plates.

With this arrangement, there is obtained the advantage that, instead of the complete chase, including the blow mold, only the relatively lightweight blow mold executes, by itself, a vertical movement inside the chase in order to be displaced out of the zone of the tube issuing continuously from the extrusion nozzle. As the vertical movement is executed with a greatly reduced weight proportion, it can take place in a shorter time than hitherto known, or is faster, so that the following tube can likewise be extruded at a higher speed. As a result, the output of the blow molding machine is increased.

As a feature of the invention, the lifting mechanism for the blow mold halves may comprise a gear drive including a meshing gear and rack for each blow mold half. Each rack is secured on a respective guide plate, and the associated gears are mounted on the form plates of the chase in coaxial relation on a gear supporting shaft on which the gears are displaceable axially of the shaft while being keyed to the shaft to rotate therewith. This lifting mechanism readily adapts itself to the faster rhythm of the blow molding machine, and assures absoulute synchronism of the movement of the two blow mold halves.

In further accordance with this feature of the invention, the gear shaft may have connected thereto a drive gear, and a stationary drive rack may be arranged alongside the horizontal guide track of the chase and parallel thereto in advance of the end of the guide track in the zone of the extruding station. The drive gear comes into engagement with this rack, and the rack has a length which corresponds to the vertical lift height of the blow mold. With this simplest form of construction of the lifting mechanism, vertical movement of the blow mold occurs as a function of the transport or horizontal movement of the chase.

In accordance with a preferred embodiment of the invention, the lifting mechanism is improved in that the vertical downward movement of the blow mold inside the chase occurs independently of the transport movement of the chase. For this purpose, in accordance with a further feature of the invention, the gear shaft has connected thereto a pivot lever and is axially displaceable, on the machine frame, relative to a fixed stop in the zone of the extruding station so that the pivot lever is moved into and out of operative relation with the stop. The stop is adapted to be engaged by the pivot lever when the opened blow mold halves are raised, and to be movable out of operative relation with the stop in the extruding station with the blow mold halves closed. The pivot lever is operatively associated with a pneumatic resetting device comprising a cylinder and piston, and the resetting device can be activated by actuation of a limit switch responsive to closing of the mold halves. In accordance with still another feature of the invention, the gear shaft is connected with a toggle lever mechanism, and is axially displaceable by actuation of this mechanism. The toggle lever mechanism is also operatively connected with the chase, and closes the latter in the stretched position of the toggle lever mechanism. A closing cylinder may be arranged in centered relation with the toggle lever mechanism and having a piston rod connected to the mechanism. In this construction, only one closing cylinder is needed, as the toggle lever mechanism actuated by the cylinder is bi-lateral and acts simultaneously on both form plates of the chase for the opening and closing of the chase.

This last-mentioned embodiment of the invention corresponds, with respect to vertical movement of the blow mold halves inside the chase, to an arrangement having lift cylinders, but which does not assure absolute synchronism of the blow mold halves required for the exact working of the blow mold machine, in particular at higher speeds.

For an understanding of the principles of the invention, reference is made to the following description of

BRIEF DESCRIPTION OF THE DRAWINGS

In the drawings:

FIG. 1 is a vertical sectional view of the chase of a blow molding machine, taken along the line I—I of FIG. 2 with the chase in the position below the blow mandrel;

FIG. 2 is a horizontal sectional view taken on the line II—II of FIG. 1;

FIG. 3 is a view of one half of the chase, according to FIG. 1, in the position below the extrusion nozzle;

FIG. 4 is a side elevation view of the open chase, shown in FIG. 1, to a smaller scale;

FIG. 5 is a side elevation view of the closed chase, shown in FIG. 3, to a smaller scale;

DESCRIPTION OF THE PREFERRED EMBODIMENTS

Figure 6:
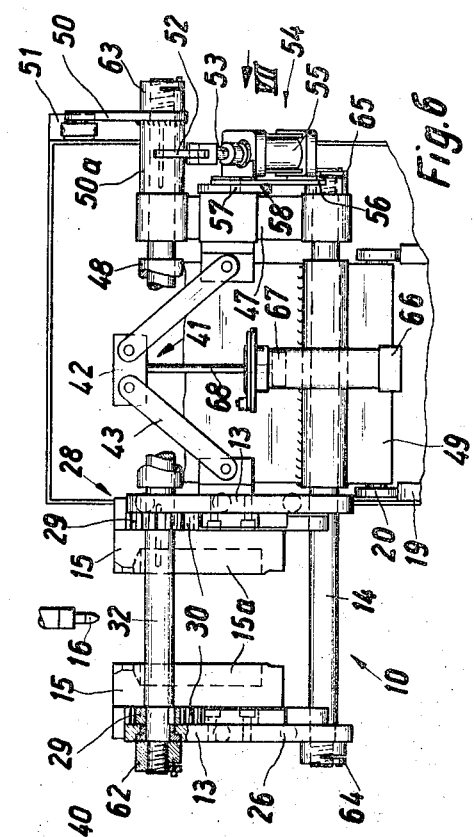
FIG. 6 is a side elevation view of another embodiment of the invention showing the chase with the blow mold halves open.

Referring first to the embodiment of the invention shown in FIGS. 1 through 5, essentially only the chase 10 of the blow molding machine is illustrated, along with the closing cylinders 11. Piston rods 12 of closing cylinders 11 are fixedly connected with the two form plates 13, which slide on bars or rods 14 of chase 10 to open and close the two blow mold halves 15, constituting the mold, and carried by the form plates.

At a blowing station A, there is a blowing mandrel 16 and, at an extruding station B, there is an extruding nozzle 17, the tubular preform being indicated at 18 in FIG. 3. Chase 10 is movable along a horizontal guide track 19 through the medium of rolls 20 rolling along this guide track. In the position illustrated in FIG. 1, chase 10 is under the mandrel 16 in the blowing station A and, in the position shown in FIG. 3, chase 10 is under the nozzle 17 of the extruding station B. The fluid pressure actuators for effecting displacement of chase 10 between stations A and B have not been shown in order to provide a clearer illustration.

The two blow mold halves 15 are fastened to respective guide plates 21. Form plates 13 carry, on their inner surfaces and approximately at mid-height, lateral guides 22 and, above and below these guides, guide rolls 23. Guide plates 21 have dove-tail type slots 24 matching the corresponding profiles of lateral guides 22, slots 24 being of limited length as is readily apparent from FIGS. 1 and 3. The difference in lengths between the lateral guides 22 and the longer slots 24 corresponds to the length of the stroke to be made available between the lowest position of blow mold halves 15, in FIG. 1, and the highest position, in FIG. 3. This height is indicated at $a$ in FIG. 3. Form plates 13 also carry rolls 26 mounted on shafts 25, these rolls being engaged by the vertically displaceable guide plates 21. The lower position of guide plates 21 is limited by an outwardly directed angle projection 27 on each guide plate, as best seen in FIGS. 1, 3, 4 and 5. These projections engage the upper edges of the associated form plates 13.

A lifting mechanism 28 is arranged between chase 10 and guide plates 21 of the blow mold, to lift and lower the blow mold relative to the chase. Lifting mechanism 28 includes a gear drive consisting of a gear 29 and a rack 30 for each guide plate. Each lift rack 30 extends in the direction of the vertical guide of the associated guide plate 21, and is adjacent the bottom edge of the associated guide plate. Gears 29 are mounted on form plates 13 of chase 10 and are designed as parts of bearings 31 which are mounted rotatably and axially non-displaceably in form plate 13, while being axially displaceable on a gear shaft 32. Gears 29 are arranged to rotate with gear shaft 32 through the medium of keys 33 engaged in grooves 34 of the hubs of the gears. The depth of each groove 34 is greater than the height of each key 33. Each gear 29 is in permanent meshing engagement with the associated rack 30.

In turn, gear shaft 32 is mounted in bearings 35 of chase 10 and is not axially displaceable. At the end of shaft 32, there is a drive gear 36 secured thereto arranged to come into meshing engagement with a drive rack 37 upon running onto the drive rack. A ramp 38 is provided at one end of drive rack 37. The effective length of drive rack 37 corresponds to the vertical lift height $a$ of the blow mold. Drive rack 37 may have, at its ramp 38, a slight bevel 39, which is not absolutely necessary, however, as the meshing engagement between drive gear 36 and rack 37 is actually assured as drive gear 36 runs up ramp 38. Rack 37 is secured to the machine frame 40 in advance of the end of the horizontal guide track 19 and in the zone of extruding station B.

As long as gear 36 meshes with rack 37, the upper end-of-stroke position of the blow mold within chase 10 is maintained by the standstill position of chase 10 below nozzle 17. As soon as gear 29 moves out of meshing engagement with rack 37, the lower end-of-stroke position of the blow mold within chase 10 is attained by the angle projections 27 acting as stops. Thus, at the same time, also the position of the gears 29 on gear shaft 32 and the position of drive gear 36 relative to drive rack 37 is fixed, so that, upon re-engagement of gear 36 with drive rack 37, the full and correct meshing engagement therebetween results automatically. The blown hollow body is indicated at 18a, and the respective mold cavities are indicated at 15a.

FIGS. 6 through 9 illustrate another embodiment of the invention, wherein the gear drive, serving as a lifting mechanism, is actuated by a lever mechanism arranged between the chase and the guide plates of the blow mold. In FIGS. 6 through 9, the same parts as illustrated in FIGS. 1 through 5 have been given the same reference characters.

In the embodiment of the invention shown in FIGS. 6 through 9, lifting and lowering of the blow mold halves again is effected by a lifting mechanism 28 including gears 29 and lifting racks 30. Gears 29 are mounted on form plates 13 of the chase and are connected to rotate with gear shaft 32. A key 33 in gear shaft 32 is displaceable in a hub groove of the gear 29 mounted on the right-hand form plate, as viewed in FIG. 6. Gear shaft 32 is mounted in the left form plate so as to be axially non-displaceable relative thereto, although gear shaft 32 is axially displaceable as a whole.

The displacement mechanism, for effecting simultaneous opening and closing of blow mold halves 15, is a toggle lever mechanism 41 with a central component 42 having two laterally extending levers, 43 and 44, articulated thereto. The left hand lateral lever 43 is articulated to a flange 45 on the right hand form plate 13. The right hand lateral lever 44 is articulated to a flange 46 of a traverse or crosstie rod 47 connecting bar 14 with gear shaft 32. Both bar 14 and gear shaft 32 are guided, for longitudinal displacement, in guide bushings 48 welded to a gusset plate 49 which, in turn, carries the suspension for rolls 20 and is a constituent part of the chase.

A pivot lever 50 has a hub 50a fixedly connected with gear shaft 32 at the right hand end thereof, and is associated with a fixed stop 51 on machine frame 40, located in the zone of extruding station B. Hub 50a also has a lever extension 52 articulated to the piston rod 53 of a resetting device 54, comprising a cylinder 55 and a piston displaceable in the cylinder. Cylinder 55 is fastened on a plate 56 which, in turn, is pivotally mounted on a pin 57 at a flange 58 of traverse 47. Flexible tubes 59 connect restting device 54 with a control box 60 containing solenoid valves, which have not been shown, but which can be actuated by a limit switch 61 arranged in the zone of the central component 42 of the toggle lever mechanism. Limit switch 61 is secured on gusset plate 49. At the opposite ends of gear shaft 32 and of bar 14, there are mounted nuts 62 and 63, 64 and 65, respectively. Nuts 62 and 64 connect gear shaft 32 and bar 14 to left form plate 13, whereas nuts 63 and 65 serve to secure pivot lever 50 to gear shaft 32 and traverse 47 to bar 14. Toggle lever mechanism 41 is actuated pneumatically by a closing cylinder 66 whose piston 67 is connected by a piston rod 68 with central part or component 42 of the toggle lever mechanism.

In the angularly bent position of toggle lever mechanism 41, as shown in FIG. 6, both blow mold halves 15 are open, and pivot lever 50, due to the axial displacement of gear shaft 32 and bar 14, is in the plane of the stop 51. This position is assumed in the blowing station A under mandrel 16, after the blown hollow body has just been ejected. Pivot lever 50 occupies the initial position shown in FIG. 7, in which it does not yet press against stop 51. Consequently, when the transport movement of the chase along rails 19 toward extruding station B begins, fixed stop 51 is engaged by pivot lever 50, and the latter pivots counterclockwise into the position shown in FIG. 9 and actuates the lifting mechanism 28 for raising blow mold halves 15 inside chase 10. The blow mold halves are still open to receive the extruded preform 18 therebetween.

Figure 8:
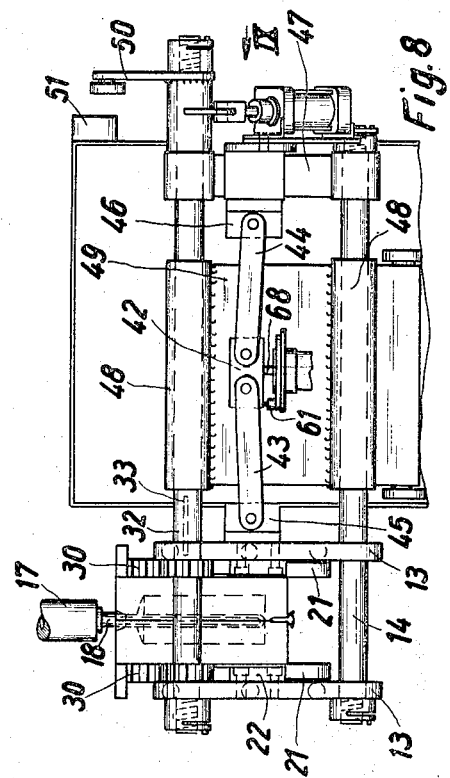
FIG. 8 is a view, similar to FIG. 6, but illustrating the chase raised and with the blow mold halves closed at the extruding station.
Figure 7:
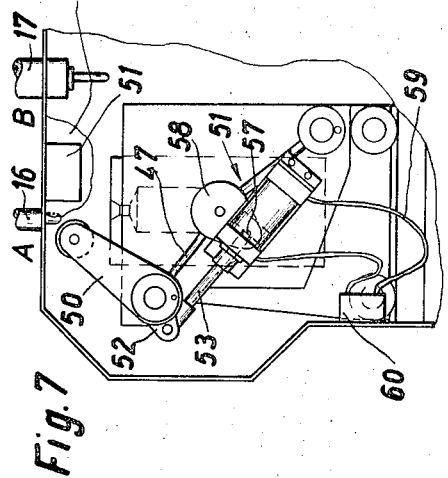
FIG. 7 is an end elevation view taken in the direction of the arrow VII of FIG. 6.
Figure 9:
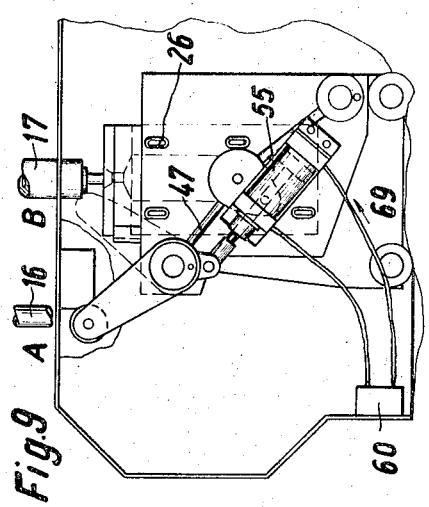
FIG. 9 is an end elevation view taken in the direction of the arrow IX of FIG. 8.

To close the mold halves, toggle lever mechanism 41 is brought into the stretched position shown in FIG. 8 by actuation of closing cylinder 66. The blow mold is closed and, at the same time, due to the displacement of gear shaft 32, pivot lever 50 is moved out of the zone of stop 51, as illustrated in FIG. 8. Limit switch 61, pressed, in this position of the toggle lever mechanism, provides the impulse for resetting pivot lever 50, this impulse being supplied to control box 60. Compressed air flows in the direction of the arrow 69 toward resetting device 54, and this device causes pivot lever 50 to pivot suddenly into the position of FIG. 7, which position is shown in broken lines in FIG. 9. The gears 29 secured to rotate with gear shaft 32 move the closed blow mold halves 15 vertically downwardly within the chase, and this movement takes place instantaneously away from nozzle 17. Due to the lateral transport movement, the closed chase comes under the mandrel 16 which moves into the blow mold halves and inflates the tubular preform to form a hollow body. Then the chase is opened again by angular bending of the toggle lever mechanism 41, as shown in FIG. 6. Following this, the new blowing operation can be repeated in the rhythm of the machine.

While specific embodiments of the invention have been shown and described in detail to illustrate the application of the principles of the invention, it will be understood that the invention may be embodied otherwise without departing from such principles.

What is claimed is:

1. In a blow molding machine for the production of hollow bodies of thermoplastic material by the extrusion-blow process, of the type including blow mold halves arranged inside a chase between form plates of the chase, and a horizontal transport drive for moving the chase with the blow mold and form plates between a receiving position, aligned with an extrusion nozzle, and a blowing position, in which the blow mold halves are offset downwardly and laterally relative to the receiving position: the improvement comprising, in combination, vertical guides on said form plates; respective guide plates having said blow mold halves secured thereto, said guide plates being engaged with said guides for vertical displacement of said blow mold halves relative to said form plates and said vertical guides; and lifting mechanism acting between said form plates and said guide plates to effect such relative vertical displacement of only said guide plates and said blow mold halves with said form plates and said vertical guides of said chase remaining fixed in elevation.

2. In a blow molding machine for the production of hollow bodies of thermoplastic material by the extrusion-blow process, of the type including blow mold halves arranged inside a chase between form plates of the chase, and a horizontal transport drive for moving the chase with the blow mold halves and form plates between a receiving position, aligned with an extrusion nozzle, and a blowing position, in which the blow mold halves are offset downwardly and laterally relative to the receiving position: the impriovment comprising, in combination, vertical guides on said form plates; respective guide plates having said blow mold halves secured thereto, said guide plates being engaged with said guides for vertical displacement of said blow mold halves relative to said form plates and said vertical guides; lifting mechanism acting between said form plates and said guide plates to effect such relative vertical displacement of only said guide plates and said blow mold halves with said form plates and said vertical guides of said chase remaining fixed in elevation; said lifting mechanism comprising racks each secured on a respective guide plate to extend vertically thereof; a shaft rotatably mounted in said chase to extend through said form plates; gears keyed to said shaft to rotate therewith, and each engaged with a respective rack, said gears being displaceable axially relative to said shaft; and means operable, responsive to movement of said chase to said receiving position aligned with an extrusion nozzle, by said transport drive, to rotate shaft to lift said blow mold halves to an upper limiting position.

3. In a blow molding machine, the improvement claimed in claim 2, in which said gears are formed on respective bearings rotatably mounted in respective form plates and secured against axial displacement relative to the associated form plates.

4. In a blow molding machine, the improvement claimed in claim 2, including a horizontally extending guide track supporting said chase for movement between said receiving and blowing positions; a drive gear secured to said shaft externally of said chase; and a stationary drive rack arranged alongside said guide track and extending parallel thereto in advance of the end of said guide track in the zone of said receiving position aligned with an extrusion nozzle; said drive gear, responsive to movement of said chase toward said receiving position by said horizontal transport drive, engaging and meshing with said rack to rotate said shaft to lift said blow mold halves to said upper limiting position; said drive rack having a length corresponding to the vertical lift height of said blow mold halves from a lower position to said upper position.

5. In a blow molding machine, the improvement claimed in claim 4, including stop means on each guide plate engageable with the associated form plate to limit downward movement of said blow mold halves responsive to disengagement of said drive gear from said drive rack as said chase is moved toward said blowing position by said transport drive.

6. In a blow molding machine for the production of hollow bodies of thermoplastic material by the extrusion-blow process, of the type including blow mold halves arranged inside a chase between form plates of the chase, and a horizontal transport drive for moving the chase with the blow mold halves and form plates between a receiving position, aligned with an extrusion nozzle, and a blowing position, in which the blow mold halves are offset downwardly and laterally relative to the receiving position: the improvement comprising, in combination, vertical guides on said form plates; respective guide plates having said blow mold halves secured thereto, said guide plates being engaged with said guides for vertical displacement of said blow mold halves relative to said form plates and said vertical guides; lifting mechanism acting between said form plates and said guide plates to effect such relative vertical displacement of only said guide plates and said blow mold halves with said form plates and said vertical guides of said chase remaining fixed in elevation; said lifting mechanism comprising racks each secured to a respective guide plate to extend vertically thereof; a pair of gears, each operatively engaged with a respective rack; a shaft rotatably mounted to extend through said form plates; means securing one end of said shaft to one form plate against relative axial displacement; one of said gears being fixed to rotate with said shaft adjacent said one form plate; the other of said gears being keyed to rotate with said shaft while being axially displaceable relative to said shaft; said shaft being axially displaceable relative to the other form plate and to said chase; a pivot lever secured to the opposite end of said shaft for rotation with said shaft and axial displacement with said shaft; a stop fixedly positioned on the frame of said blow molding machine in the zone of said receiving position; said pivot lever being movable into and out of operative relation with said stop responsive to axial displacement of said shaft; said pivot lever being displaced into the plane of said stop responsive to opening of said blow mold halves so that, upon movement of said chase toward said extrusion nozzle by said transport drive, said pivot lever will engage said stop to rotate said shaft to lift said blow mold halves.

7. In a blow molding machine, the improvement claimed in claim 6, in which said pivot lever is moved out of the plane of said stop when said chase is aligned with said extrusion nozzle and responsive to closing of said blow mold halves; resetting means operable to pivot said pivot lever to a position effecting lowering of said blow mold halves; and means operable, responsive to closing of said blow mold halves, to activate said resetting means.

8. In a blow molding machine, the improvement claimed in claim 7, in which said resetting means comprises a pneumatic cylinder-piston actuator connected to said pivot lever; said means operable responsive to closing of said blow mold halves comprising a limit switch actuated responsive to closing of said blow mold halves; and control means controlling the supply of air to said actuator and controlled by said limit switch.

9. In a blow molding machine, the improvement claimed in claim 8, including a toggle lever mechanism connected to said shaft and in operative connection with said blow mold halves; said shaft being axially displaceable by actuation of said toggle lever mechanism and said toggle lever mechanism, in its expanded position, closing said blow mold halves; and a piston-cylinder actuator having a piston rod connected to said toggle lever mechanism and operable to expand and contract the latter, said actuator being arranged centrally of said toggle lever mechanism.

* * * * *